United States Patent
Fellin et al.

[15] 3,707,008
[45] Dec. 26, 1972

[54] AUTOMOTIVE SEAT PAD FOR USE BY CHILDREN

[72] Inventors: Jack J. Fellin; Karin E. Fellin, both of 1495 West 24th Place, Eugene, Oreg. 97405

[22] Filed: Dec. 31, 1970

[21] Appl. No.: 103,118

[52] U.S. Cl. .......................... 5/345, 5/341, 297/250
[51] Int. Cl. ........................... A47g 7/06, A47d 1/10
[58] Field of Search .......... 5/345, 334, 335, 336, 337, 5/339, 341, 348–350; 297/250, 345, 385

[56] References Cited

UNITED STATES PATENTS

| | | | |
|---|---|---|---|
| 3,547,489 | 11/1968 | Grieser | 297/250 X |
| 3,148,389 | 9/1964 | Lustig | 5/341 X |
| 3,243,828 | 4/1966 | McCarty | 5/341 X |
| 3,207,552 | 9/1965 | Loughney | 297/250 X |
| 2,888,976 | 6/1959 | Hart | 297/250 |

*Primary Examiner*—Bobby R. Gay
*Assistant Examiner*—Andrew M. Calvert
*Attorney*—James D. Givnan, Jr.

[57] ABSTRACT

A seat pad for placement on an automobile seat enabling children or other users of same to sit at a substantially normal eye level. The pad includes integral sections with each section being adjustable to provide the seating height desired. The pad includes openings for the passage of the automobiles seat belts which in addition to their normal function serve to retain the pad in place. Each section of the pad receives insertable layers of resilient foamed material the number and thicknesses of which will determine the effective seating height. The sidewalls of the pad are of a pliable nature to permit varying of the pads seating surface.

4 Claims, 5 Drawing Figures

PATENTED DEC 26 1972
3,707,008
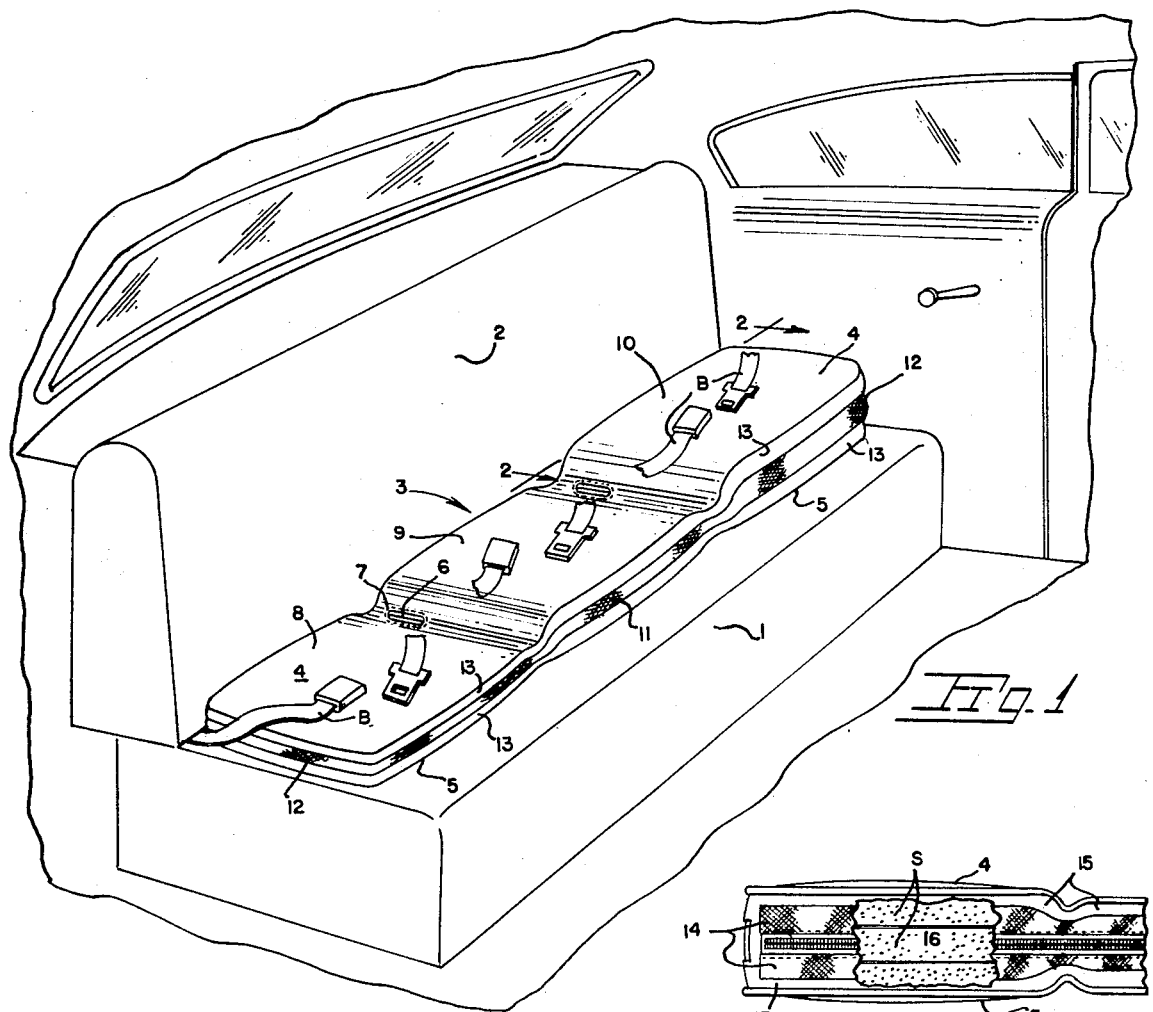
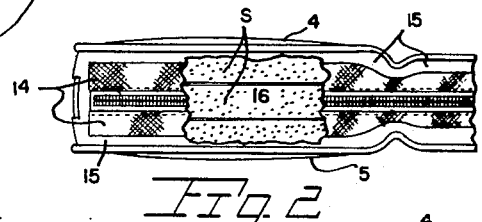
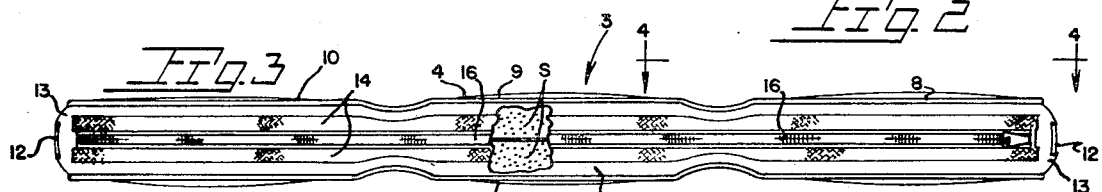
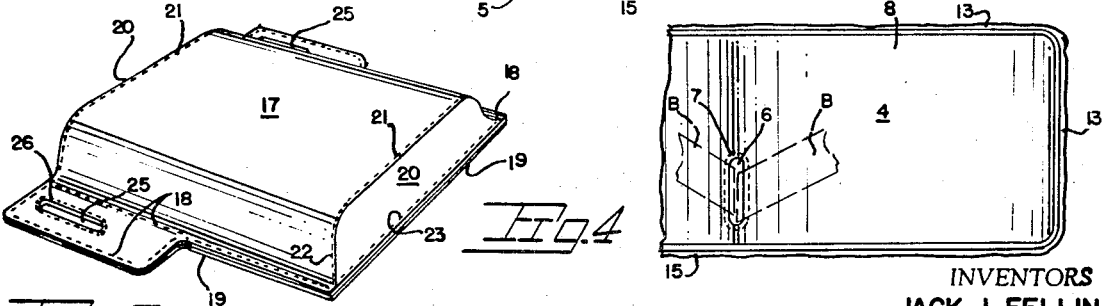
INVENTORS
JACK J. FELLIN
KARIN E. FELLIN
BY
AGENT

AUTOMOTIVE SEAT PAD FOR USE BY CHILDREN

BACKGROUND OF THE INVENTION

The present invention relates generally to auxiliary automobile seating devices for children and more particularly to one that provides for raising the effective seating height of a user or users.

Automobile travel with children presents many problems all too well known to parents. Small children confined within an automobile, for lengthy periods of time, often become bored with travel and look to their fellow passengers for entertainment, peaceful or otherwise. It is generally accepted that if the young automobile passengers are seated at a proper height the boredom will be lessened somewhat since they may view the passing sights.

Toward this end various types of children's car seats have been made available for very young children which, for the most part, are of the type suspended from the back of the auto seat. Such children's seats are not secured to the auto seat other than by the weight of the child urging the support members of the car seat downwardly onto the back of the auto seat. In addition to lacking safety features, entry and exit of children from such car seats is extremely awkward. A further problem exists in storage of the car seat when not in use. The above referred car seat has an additional disadvantage in that it is for use only by very small children and is not usable for purposes of the present invention.

For children too old for a car seat, the child is relegated to using a makeshift auxiliary seat usually of loose cushions or folded blankets to raise him to a height where he may view out of the automobile. The use of a seat belt with such a makeshift seat is, at best, very unlikely. More often than not young children too old for use of an auxiliary car seat yet too small in size to satisfactorily view outwardly of the vehicle, will resort to standing on the automobile seat thus rendering the child extremely susceptible to injury upon sudden deceleration of the vehicle.

SUMMARY OF THE INVENTION

The instant invention is embodied within a pad-like article for retained placement on an automobile seat and which is adaptable to supporting children of various sizes to raise same to a proper viewing level. The user or users of the seat pad may utilize the automobiles conventional seat belts.

The pad, in one form, may extend the length of the auto seat, in which case, it comprises integral sections with openings admitting the passage of seat belts intermediate the sections. Also, the belts retain the pad against displacement when the pad is not in use.

An opening in the pad permits the insertion of resilient foam cushions the number and thicknesses of which determine the height of the uppermost or seating surface of the pad. Accordingly, a family with two or three children may adapt the height of a pad section to suit each child. Each child having their own section of the pad reduces the likelihood of the familiar disagreements over who will sit where.

The pad, when not in use, is foldable for compact storage in the passenger compartment wherein it may be used in its folded configuration as a pillow. The resilient foamed material within the sections of the pad is in the form of "squares" which are insertable to provide the thickness and firmness desired. A closure is provided along the rearmost edge of the pad to provide access to each pad section.

One form of the pad-like article embodies an insert member, sewn in place and extending about the pad. The member is of stretchable fabric to further accommodate various thicknesses of the foamed material.

BRIEF DESCRIPTION OF THE DRAWING

In the accompanying drawing:

FIG. 1 is a perspective view of an automobile interior showing the seat pad embodying the present invention in place on a seat thereof, FIG. 2 is an elevational view taken along line 2—2 of FIG. 1 showing a typical pad section and zipper opening therefor, FIG. 3 is a side elevational view of the pad showing the unseen side of FIG. 1 with the pad sections being altered to be of a uniform thickness, FIG. 4 is a plan view taken downwardly along line 4—4 of FIG. 3 showing a pad section and an adjacent seat belt opening, and FIG. 5 is a perspective view of a modified form of seat pad which provides a single seating area and which dispenses with a stretchable fabric insert.

DESCRIPTION OF PREFERRED EMBODIMENTS

With continuing reference to the drawing wherein applied reference numerals indicate parts similarly identified in the following specification, the reference numerals 1 and 2 indicate, respectively, the seat and seat back of an automobile. While a rear seat structure is shown, it will be obvious from the following description that the present invention, in the same or modified form, is useful when in place on the autos front seat as well.

Indicated generally at 3, in FIG. 1, is the seat pad which is shown occupying the length of the seat 1 while being of somewhat less than the auto seat width for the purpose of providing comfortable sitting for a child. Obviously the pad may, if desired, fully overlie the seat 1.

Extending the length of the pad are top and bottom members 4 and 5 which may be of an attractive vinyl or similar pliable plastic material of a durable, easy cleaning nature. Members 4 and 5 are provided with corresponding cut-out or slot shaped areas 6 for the passage therethrough of the belt halves B of the automobiles seat belts. The areas 6 are of a size to each closely receive two belt halves with one each being for adjacent occupants. The perimeter of each area 6 is defined by contiguous edges of the top and bottom members 4 and 5 through which stitching at 7 extends.

Each of the open slotted areas 6 are located adjacent the rearmost (relative to the auto) edge of the pad for convenient reception of the seat belt halves which pass in the usual manner rearwardly between the seat 1 and seat back 2 to an anchoring point. A pair of crosswise valleys or depressions resulting from the stitching 7 generally define the pad sections. In FIG. 1, pad sections are indicated at 8, 9 and 10. The stitching 7 further serves to retain the foamed material against lateral displacement into an adjacent pad section.

One form of the invention comprehends the use of a sidewall having an insert of stretchable fabric to facilitate insertion of the foamed cushions or "squares S" and to permit maximum displacement between the top and bottom members. As later explained, the vinyl or similar material used for the perimetrical sidewall of the pad may, as an alternative, be cut full to allow for such displacement. In FIG. 1 a stretchable fabric insert 11 is shown extending along the forward edge of the pad 3 with terminal portions extending around and along the pad ends as at 12. Above and below the stretchable insert 11, are strips at 13 of pliable vinyl or like material which are sewn along their length to the pads top and bottom members 4 and 5. As typically shown in FIG. 2 the rearward edge or wall of the pad, in similarity to the foregoing, has an insert at 14 of stretchable fabric stitched in place along its upper and lower margins to the vinyl portions 15 of the rear edge. Extending lengthwise of the pads rear edge is a zipper closure 16. The details of stitching and seam construction are considered conventional and hence need no elaboration.

If desired the zipper 16, instead of extending the length of the pad, may be dispensed with and a plurality of zippers installed each corresponding approximately in length to the length of a pad section.

The resilient foamed cushions or "squares" may be of any commercially available material commonly used in the upholstering of furniture as for example polyurethane foam. This material is readily available in various thicknesses and may be easily cut to the size desired. A quantity of "squares" with some having different thicknesses will permit same or a combination thereof to fill each pad section to the extent necessary to provide the sitting height desired.

The pad 1 is retained in place at all times by reason of the belts halves B with the open areas 6 in the pad preferably having a crosswise dimension so as to effect a degree of frictional engagement with the webs of each belt. A coincidental advantage of such an arrangement is that the middle seat belts are at all times spaced apart to facilitate the proper selection of each belt half with no belt selection problem for the outer occupants as there remains only two belt halves to fasten.

A modified form of pad dispenses with the stretchable insert members 11, 12 and 14 and provides for adjustable spacing of the pads top and bottom members by means of a sidewall entirely of vinyl, or similar material, cut in a full manner with the sidewalls so cut curving outwardly to some extent. Upon filling of a pad section with the selected "squares" the sidewalls will tend to flex to the vertical.

A still further modification resides in the embodiment of FIG. 5 wherein the invention provides adjustable sitting for an individual. In this form of the invention, a top member 17 is stitched adjacent its ends in parallel rows at 18 to a bottom member at 19. Front and rear sidewalls as at 20 are stitched along their upper edges at 21 and their sides at 22 to the upper member 17 while along the sidewalls lower margin a line of stitching 23 secures same to bottom member 19. In the marginal areas of the upper and lower members cut out areas at 25, defined by stitched edges at 26, are formed to receive the seat belt halves for the occupant. Not shown is the zipper closure extending along the rear sidewall to permit filling of the pad as desired in the manner earlier described.

While I have shown but a few embodiments of the invention it will be apparent to those skilled in the art that the invention may be embodied still otherwise without departing from the spirit and scope of the invention.

Having thus described the invention what is desired to be secured under a Letters Patent is:

1. A seat pad for young children for placement lengthwise along an automobile seat for individually elevating the sitting height of each child occupant to permit seated viewing out of the automobile during travel, said pad comprising, upper and lower pad members of generally rectangular configuration providing plural seating sections and interconnecting sidewall means all of pliable material and adapted to enclose various thicknesses of cushion inserts therebetween thereby providing for the individual height adjustment of each seating section according to the childs size, said upper and lower members defining corresponding slotted areas at spaced intervals between said sections, said slotted areas adapted to permit the passage of automobile seat belt halves through the pad members permitting use of the seat belts by the pad occupants in the normal manner, said belt halves being permanently retained by said slotted areas thereby facilitating proper belt half selection by a child, and said sidewall means including closure means permitting both the addition and removal of the cushion inserts into and out of each section to effect the desired sitting height of each child.

2. The seat pad as claimed in claim 1 wherein said slotted areas have a crosswise dimension less than the thickness of two juxtaposed seat belt halves for frictional engagement of the latter with the seat pad for purposes of pad retention in place on the auto seat when the pad is not in use.

3. The seat pad as claimed in claim 1 wherein said sidewall means includes fabric inserts of stretchable material yieldable to facilitate the adding of cushion inserts to achieve the pad thickness desired for the occupant of a pad section.

4. The seat pad as claimed in claim 3 wherein said slotted areas have a crosswise dimension less than the thickness of two juxtaposed seat belt halves for frictional engagement of the latter with the seat pad for purposes of pad retention in place on the auto seat when the pad is not in use.

* * * * *